(12) United States Patent
Knowles

(10) Patent No.: US 8,776,957 B2
(45) Date of Patent: Jul. 15, 2014

(54) ANTI-BLOWBACK BRAKE RETRACTOR ASSEMBLY

(75) Inventor: Richard N. Knowles, Waterloo, IA (US)

(73) Assignee: Deere & Company, Moline, IL (US)

( * ) Notice: Subject to any disclaimer, the term of this patent is extended or adjusted under 35 U.S.C. 154(b) by 125 days.

(21) Appl. No.: 13/002,566

(22) PCT Filed: Jul. 7, 2008

(86) PCT No.: PCT/US2008/008309
§ 371 (c)(1),
(2), (4) Date: Mar. 8, 2011

(87) PCT Pub. No.: WO2010/005412
PCT Pub. Date: Jan. 14, 2010

(65) Prior Publication Data
US 2011/0266099 A1    Nov. 3, 2011

(51) Int. Cl.
*F16D 55/22* (2006.01)
(52) U.S. Cl.
USPC ... 188/72.3; 188/72.1; 188/72.5; 188/1.11 W; 188/1.11 R; 188/196 P
(58) Field of Classification Search
USPC ........... 188/71.5, 72.1, 1.11 W, 1.11 R, 196 P
See application file for complete search history.

(56) References Cited

U.S. PATENT DOCUMENTS

| | | | |
|---|---|---|---|
| 2,536,269 A | | 1/1951 | Driscoll |
| 3,194,350 A | * | 7/1965 | Soltis ........................... 188/71.8 |
| 3,403,754 A | * | 10/1968 | Barrett et al. ................ 188/71.5 |
| 3,589,479 A | | 6/1971 | Plaat et al. |
| 4,375,842 A | | 3/1983 | Melinat |
| 5,035,303 A | | 7/1991 | Sullivan |
| 6,367,591 B1 | * | 4/2002 | Gosda .......................... 188/71.8 |
| 6,543,587 B1 | | 4/2003 | Albrecht |
| 2008/0116019 A1 | | 5/2008 | Vu |

FOREIGN PATENT DOCUMENTS

JP      2000304078      10/2000
WO       9004115 A1     4/1990

OTHER PUBLICATIONS

European Search Report dated May 30, 2012 (6 pages).

* cited by examiner

*Primary Examiner* — Robert A Siconolfi
*Assistant Examiner* — Mahbubur Rashid

(57) ABSTRACT

A brake retractor assembly (10) for a vehicle, such as an agricultural vehicle, includes a brake housing (12) and a brake cover (14) defining a friction chamber (16). A brake piston (18) is arranged within the friction chamber (16) and coupled to the brake cover (14) by a bolt (44) including a first end (46) coupled to the brake cover (14) and a second end (48) coupled to the brake piston (18). A portion of the second end (48) passes through the brake piston (18) via a bore (64) defined in the brake piston (18) and is fixedly retained to the brake piston (18). An actuation system (24) is coupled to apply an axial force to the brake piston (18). Activation of the actuation system (24) results in axial movement of the brake piston (18) in a first direction (80). Deactivation of the actuation system (24) results in axial movement of the brake piston in a second direction (82). Axial movement of the brake piston (18) in the second direction (82) is limited by the fixed retention of the bolt to the brake piston.

14 Claims, 4 Drawing Sheets

ANTI-BLOWBACK BRAKE RETRACTOR ASSEMBLY

BACKGROUND

1. Field of the Invention

The present invention generally relates to a brake retractor assembly for a motor vehicle. More specifically, it relates to a device that maintains a desired running clearance in the brake disks used in the brake assembly of an agricultural vehicle, such as a tractor.

2. Description of Related Technology

Brake assemblies are generally used to stop the movement of motor vehicles, such as an agricultural tractor. As shown in U.S. Pat. No. 6,002,976, the driveline of a typical agricultural tractor, for example a tractor in the John Deere 6000 series, includes an engine, a shifted multi-speed transmission, a reversing unit, a drive clutch, an optional creeper transmission, a shifted range transmission, and a rear axle differential gear which the drives the rear wheels. As shown in U.S. Pat. No. 5,197,574, a brake may also be provided between the transmission housing and the rear axle differential gear. Due to the low operating speeds, large mass and high torque under which agricultural tractors operate, these brakes are often configured so the brake disks are submerged in oil. The oil serves to lubricate and carry heat away from the brake disks when the brakes are applied by a tractor operator.

When the brakes are initially assembled, an optimal running clearance is set between a brake piston, the brake disks, separator plates (if applicable) and a brake cover. The optimal running clearance is carefully calibrated, depending on the geometry of a particular application, to minimize the response time and pedal throw required to engage the brake piston against the brake disks, while also minimizing the effects of windage (the frictional force acting on the oil caused by the relative motion of the brake disks to the brake piston separator plates and cover). Ideally, a very small running clearance is desired to allow for fast brake engagement and a short pedal throw. During brake disengagement, however, blowback (i.e., waviness, runout, or walking) of the brake disk can push the brake piston further away from the brake disk than desired, creating a larger running clearance than desired, and thus a longer pedal throw. This undesirably increases the brake pedal travel and response time required for brake engagement.

In view of the above, it is apparent that there exists a need for a brake retractor assembly for a motor vehicle that prevents blowback and maintains a desired running clearance of the brake disks.

SUMMARY

In satisfying the above need, as well as overcoming the enumerated drawbacks and other limitations of the related art, the present invention provides an anti-blowback brake retractor assembly. This is accomplished by providing a brake housing and a brake cover defining a friction chamber. A brake piston is arranged within the friction chamber and coupled to the brake cover by a bolt. The bolt includes a first end attached to the brake cover and a second end coupled to the brake piston. The first end of the bolt is threaded and is engaged in a bore defined in the brake cover. The second end is engaged in a bore defined in the brake piston. A portion of the second end of the bolt passes through the brake piston via the second bore and is fixedly retained to the brake piston.

An actuation system is coupled to the brake piston to apply an axial force to the brake piston. At least one brake disk having braking surfaces is provided within the friction chamber between the brake piston and the brake cover. Activation of the actuation system results in axial movement of the brake piston in a first direction until the braking surfaces of the brake disk engage the brake piston and brake cover. Deactivation of the actuation system results in axial movement of the brake piston in a second direction in which the braking surfaces of the brake disk disengage from the brake piston and the brake cover. Axial movement of the brake piston in the second direction is limited by the fixed retention of the bolt to the brake piston.

Further objects, features and advantages of this invention will become readily apparent to persons skilled in the art after a review of the following description, with reference to the drawings and claims that are appended to and form a part of this specification.

DETAILED DESCRIPTION

Figure 1:
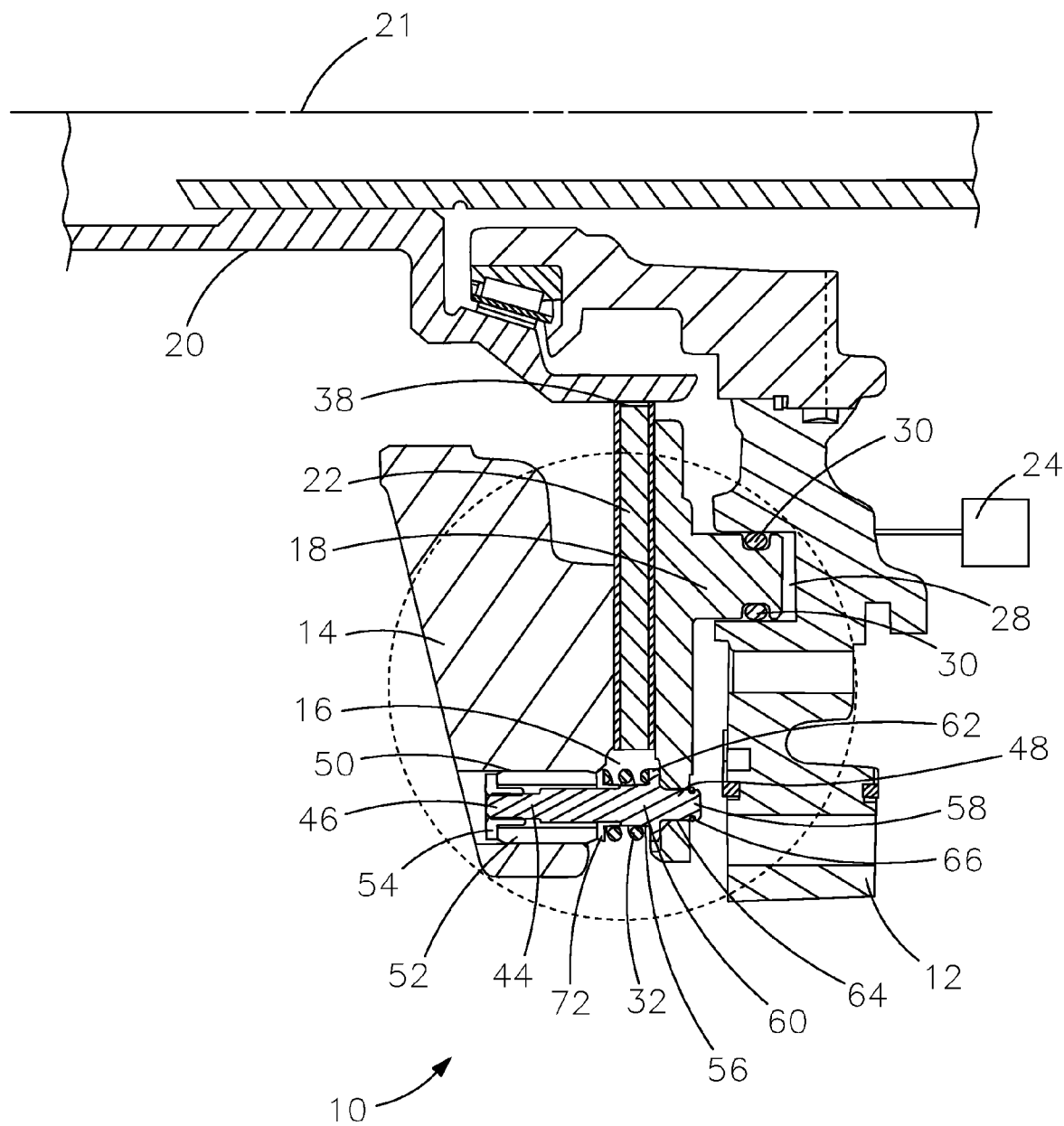
FIG. 1 is a partial cross-sectional view of a brake assembly, having a single brake disk, along a centerline of a shaft.

Referring now to the drawings, FIG. 1 shows a brake assembly designated at 10, generally embodying the principles of the present invention. As its primary components, the brake assembly 10 includes a brake housing 12 and a brake backing plate or brake cover 14 defining a friction chamber 16. A brake piston 18 is arranged within the friction chamber 16 and movably connected to the brake housing 12 and the brake cover 14. Fixedly coupled to a rotating shaft 20 of the vehicle (not shown) is at least one brake disk 22, disposed within the friction chamber 16 between the brake piston 18 and the brake cover 14. Activation of an actuation system 24 moves the brake piston 18 axially, generally parallel to a center line 21 of the shaft 20, closing the running clearances 26 (FIG. 3) on each side of the brake disk 22 and resulting in frictional engagement of the rotating brake disk 22 between the brake piston 18 and the brake cover 14.

The actuation system 24 may be any conventional system including, but not limited to, hydraulic, pneumatic, or electrical systems. The present embodiment presumes a hydraulic system. When the actuation system 24 is activated, for example by an operator depressing a brake pedal (not shown), pressurized hydraulic fluid is provided to a brake piston area 28. The fluid is contained within the brake piston area 28 by one or more o-rings 30 and applies a brake engagement force to the brake piston 18 causing the piston 18 to move axially and engage the brake disk 22. When the actuation system 24 is deactivated, the hydraulic fluid is depressurized and at least one spring 32 returns the brake piston 18 to its initial position, disengaging it from the brake disk 22.

Figure 2:
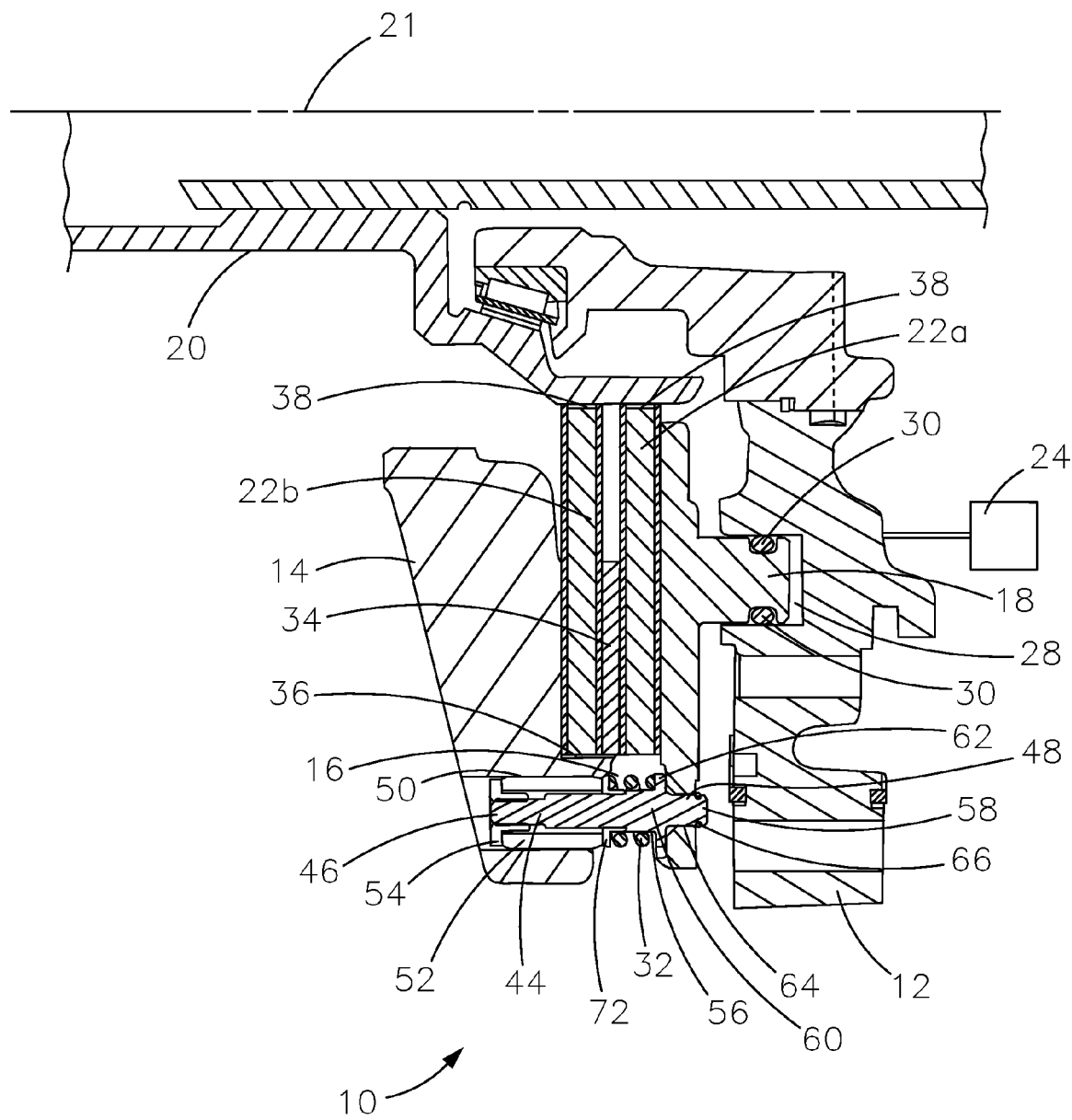
FIG. 2 is a brake assembly, similar to that of FIG. 1, having dual brake disks.

FIG. 2 illustrates a second embodiment including a separator plate 34 in the friction chamber 16 located between two brake disks 22a and 22b. Separator plates 34 are only necessary for those embodiments including more than one brake disk 22, and the number of separator plates 34 for a particular embodiment is one less than the number of brake disks 22.

The separator plate 34 is attached to the brake cover 14 by a connection 36 configured to prevent rotation of the separator plate 34 while still permitting axial movement. In the example shown in FIG. 2, the connection 36 includes tabs attached to the separator plate 34 and slideably engaged with slots (not shown) in the brake cover 14. This has the advantage of being simple to fabricate and low in cost. In another embodiment, a radial spline (not shown) on the outer diameter of the separator plate 34 engages a mating spline on the inner diameter of the brake cover 14. While a spline may result in a more durable connection 36, it is also more costly and difficult to manufacture than other arrangements.

The brake disk 22 may be coupled to the rotating shaft 20 by means of a disk spline 38, or a similar arrangement, that allows the brake disk 22 to float axially along the shaft 20 while still transferring torque between the disk 22 and the shaft 20. In the present example, the rotating shaft 20 is further coupled to wheels of the motor vehicle (not shown) by, for example, a differential and to an engine by, for example, a transmission. When the vehicle (not shown) is in operation, the brake disk 22, being coupled to the rotating shaft 20, rotates within the friction chamber 16. Stopping the rotation of the brake disk 22 stops rotation of the shaft 20 and, accordingly, stops rotation of the wheels and brings the vehicle to a halt. This is but one exemplary use of the brake assembly 10. Another example may locate two brake assemblies 10 between the differential and the wheels.

Figure 3:
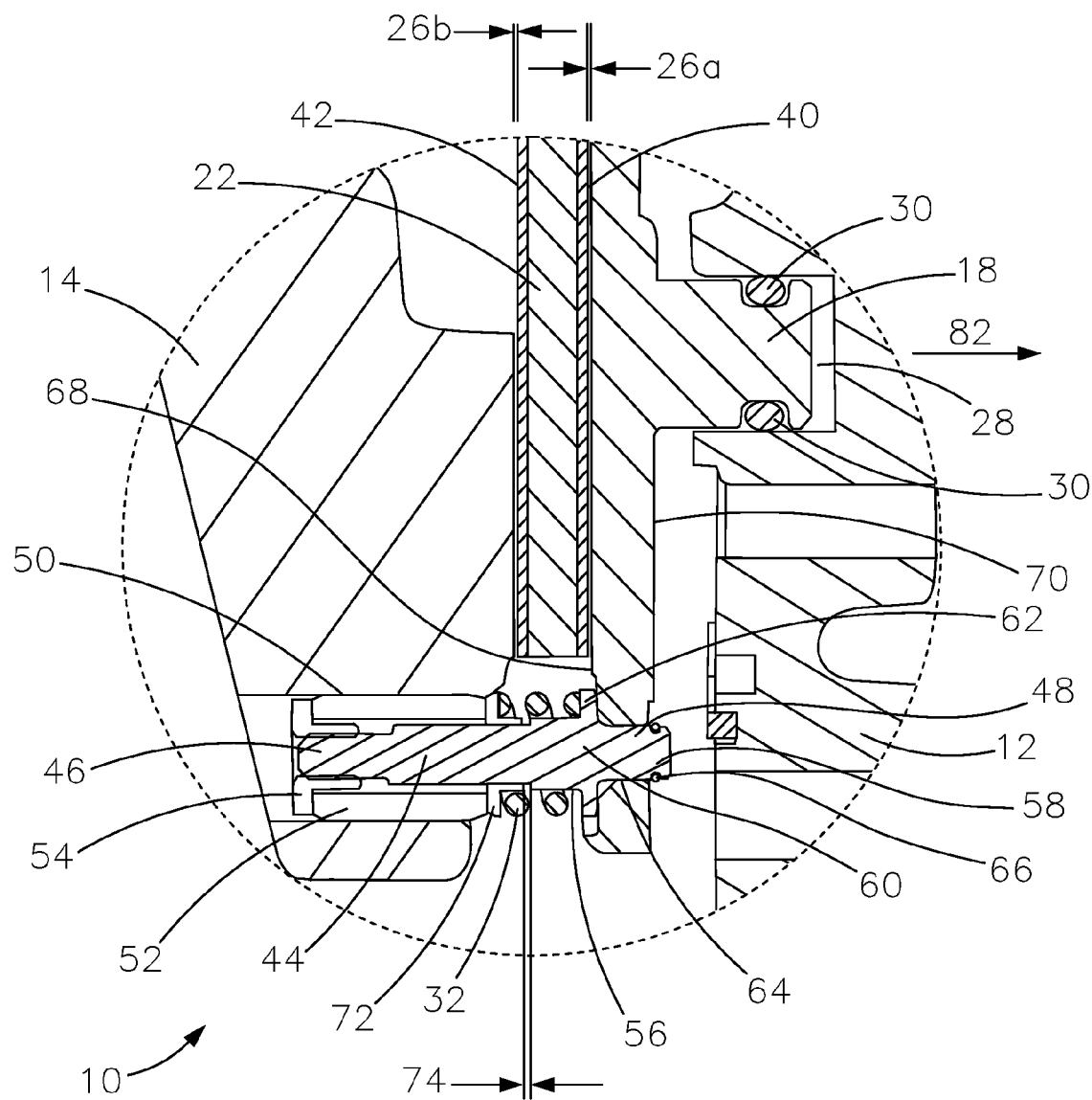
FIG. 3 is an enlarged view, of the portion generally enclosed by circle 3 in FIG. 1, showing the brake assembly in a disengaged state of operation.

Turning to FIG. 3, the rotating brake disk 22 is stopped by applying a frictional braking force to the braking surfaces 40 and 42 of the brake disk 22. The frictional force is applied by clamping the brake disk 22 between the brake piston 18 and the brake cover 14, and (if applicable) the separator plate 34. The application of friction generally turns kinetic energy of the rotating shaft 20 into heat, which may be dissipated away from the brake disks 22 by any appropriate means. While some brake assemblies may use air to cool the brake disk 22, the present embodiment submerges the brake disk 22 in oil. This provides both cooling and lubrication to the brake assembly 10 and is particularly appropriate for use with agricultural tractors.

Referring to FIG. 3, the clamping of the brake disk 22 is done by moving the brake piston 18 over a running clearance 26a into contact with a first braking surface 40 of the rotating brake disk 22. Upon contacting the first braking surface 40, the brake disk 22 is moved by the brake piston 18 a distance corresponding to a final running clearance 26b. The brake piston 18, and the other components described above, only stop moving once the second braking surface 42 of the brake disk 22 closes the final running clearance 26b and contacts the brake cover 14 (see FIG. 4).

The actual running clearance of the brake assembly 10 is equal to the distance the brake piston 18 must travel in order to clamp the brake disk 22; it is therefore equal to the sum of the running clearances 26a and 26b. (See FIGS. 3 and 4) Thus, as the second braking surface 42 of the brake disk 22 closes the final running clearance 26b and contacts the brake cover 14, the brake piston 18 moves a distance equal to the length of the actual running clearance of the brake assembly 10.

Figure 4:
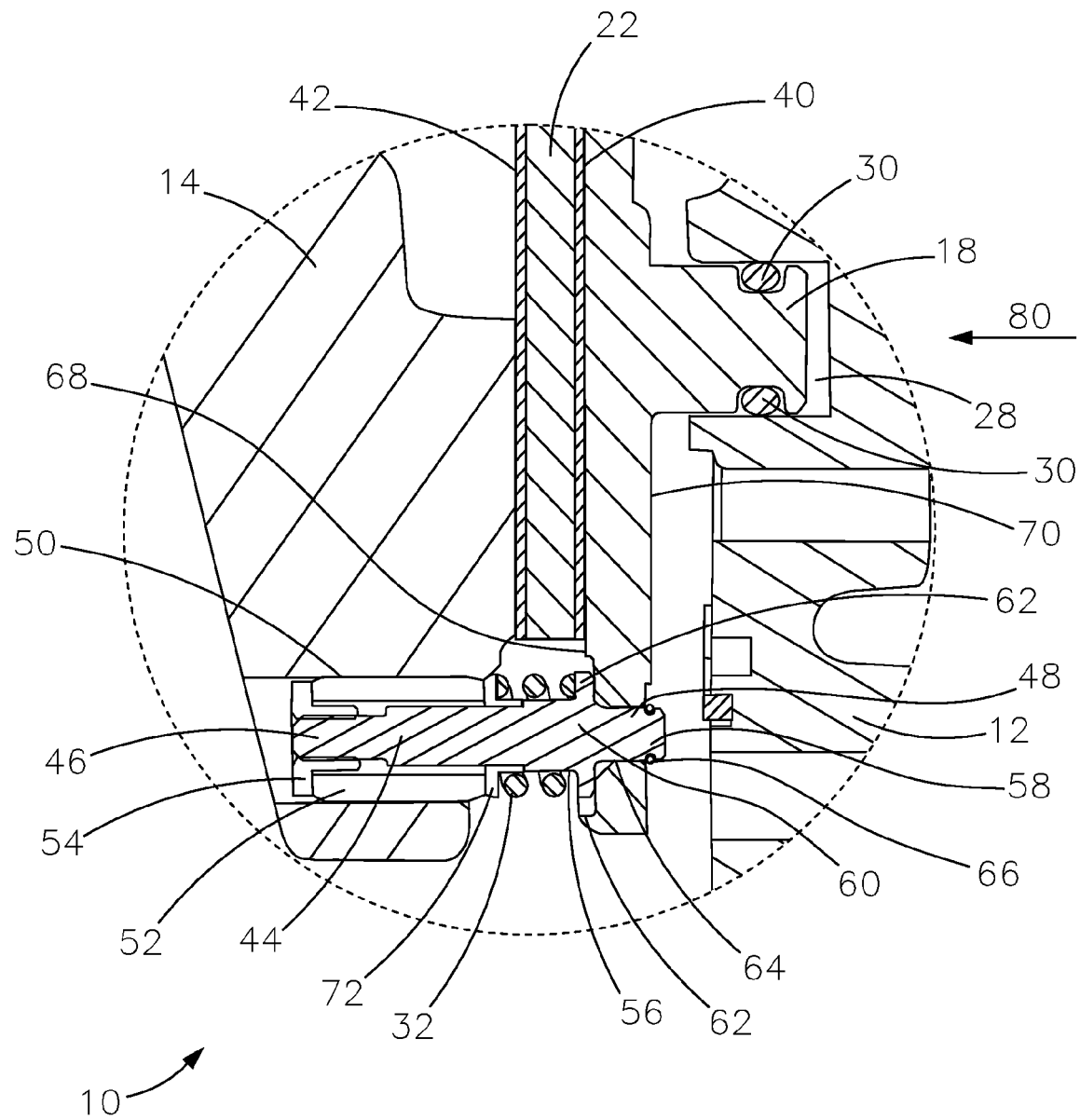
FIG. 4 is an enlarged view, of the portion generally enclosed by circle 3 in FIG. 1, showing the brake assembly in an engaged state of operation.

The brake piston 18 is coupled to the brake cover 14 by at least one bolt 44, and may include a plurality of bolts 44. As best shown in FIG. 3 or 4, the bolt 44 includes a first end 46 coupled to the brake cover 14 and a second end 48 coupled to the brake piston 18. The first end 46 of the bolt 44 is slidably received within a sleeve or bushing 52 that is further received within a bore 50 defined in the brake cover 14. Preferably, the terminal portion of the first end 46 is threaded and engages a nut 54, which operates to limit axial movement of the bolt 44 in the direction of arrow 82 toward the brake housing 12. In another embodiment, the first end 46 may be attached to the brake cover 14 via a roll pin that is pressed into the bore 50. In this embodiment, during brake engagement, the piston force overcomes the press force, allowing the roll pin to slide deeper into the bore. As the brake disk friction material wears, this function maintains the running clearance by adjusting the depth of the retractor. The bolt 44 may be coupled to the brake cover 14 by any suitable means which allows axial movement of the bolt 44 within the bore 50 and thus allows axial movement of the brake piston 18 during brake engagement and disengagement.

The second end 48 of the bolt 44 includes a bolt head 56 having a nose portion 58 and a body portion 60 separated by a shoulder or flange 62. The flange 62 abuts a surface of the brake piston 18 along the side 68 of the brake piston 18. The nose portion 58 of the bolt's second end 48 extends through a bore 64 in the brake piston 18 and a terminal end of the nose portion 58 extends out of the bore 64 at the opposing side 70 of the brake piston 18. The terminal end of the nose portion 58 is retained to the brake piston 18. In this embodiment, the terminal end of the nose portion 58 is retained to the brake piston 18 by a snap ring 66 received in a groove of the nose portion 58. The flange 62 cooperates with the snap ring 66 to couple the second end 48 of the bolt 44 to the brake piston 18 such that axial movement of the brake piston 18 is limited to that of the bolt 44, thereby causing the brake piston 18 to move with the bolt 44. The bolt 44 may be retained to the brake piston 18 by any suitable means such that axial movement of the brake piston 18 is limited by axial movement of the bolt.

A bushing or top hat spacer 72 is disposed about the bolt 44 between the brake piston 18 and the brake cover 14 and is adjacent the sleeve 54 within the bore 50 defined in the brake cover 14. The first end 46 of the bolt 44 is also provided with a portion having an outer diameter d1 that is less than the inner diameter d2 of the opening within the spacer 72. This enables the first end 46 to pass through the opening within the spacer 72. The body portion 60 of the bolt head 56 is enlarged relative to the first end 46 and provided with an outer diameter d3 that is greater than the inner diameter d2 of the opening within the spacer 72. With a shoulder accordingly being formed between the first end 46 and the body portion 60 of the bolt 44, the spacer 72 limits axial movement of the bolt 44 in the direction of arrow 80 away from the brake housing 12 by preventing the body portion 60 of the bolt head 56 from moving further than the spacer 72.

The bolt 44 is received within the spring 32 that is coaxially arranged around the bolt 44 between the flange 62 of the bolt head 56 and the spacer 72. The spring 32 acts to bias the bolt 44 toward the brake housing 12, in the direction of arrow 82. In its biased position, the body portion 60 is axially spaced from the brake cover 14 by a distance equal to an optimal running clearance, as reflected by gap 74 shown in FIG. 3.

The optimal running clearance is calculated based on various factors including the number of brake disks 22, separator plates 34, the required response time of the brake assembly 10, the brake pedal throw (not shown) of the actuation system 24, and the cooling requirements for a particular application. Since most applications desire a quick response time and a short pedal throw, it is desirable for the gap 74 to be as small as possible. However, at a certain point the gap 74 will be too small and incidental contact may result between the brake disks 22, brake cover 14, brake piston 18, and the separator plates 34 when the brake is not engaged due to the tolerance stack up between these components. In addition, windage effects may generate additional heat and prevent sufficient cooling oil from flowing between the brake disks 22. These factors may cause damage to brake assemblies 10 having very small running clearances 26. Thus, the optimal running clearance is calculated to eliminate the risk of damage, while still keeping the response time and pedal throw to a minimum.

In a preferred embodiment, activation of the actuation system 24 applies a fluid pressure against the brake piston 18 and causes the brake piston 18 to move axially in the direction of arrow 80 over the running clearance 26a to engage the first braking surface 40 of the rotating brake disk 22. The brake piston 18 then moves the brake disk 22 a distance corresponding to a final running clearance 26b upon which the second braking surface 42 of the brake disk 22 engages the brake cover 14. The axial movement of the brake piston 18 in the direction 80 compresses the spring 32 and causes the bolt 44 to move axially in the direction 80 with the brake piston 18. The amount of axial movement in the direction 80 is determined by the axial spacing between the body portion 60 of the bolt head 56 and the brake cover 14.

Preferably, the axial spacing between the biased position of the body portion 60 of the bolt head 56 and the brake cover 14 is equal to the sum of the axial height of the spacer 72 and the optimal running clearance 74. Axial movement of the bolt 44 in the direction 80 is thus limited by the spacer 72 because as the first end 46 of the bolt is able to pass through the opening within the spacer 72, and further through the bore 50, the spacer 72 is dimensioned so as to prevent the body portion 60 from passing through the opening within the spacer 72 (i.e., d3 is greater than d2), thereby obstructing further movement of the bolt 44 in the direction 80. Thus, the axial movement of the bolt 44 in the direction 80 is restricted to the movement between the biased position of the body portion 60 and the spacer 72, i.e., a distance equal to the optimal running clearance 74, which is equal to the sum of the running clearances 26a and 26b.

In this embodiment, deactivation of the actuation system 24 releases the fluid pressure applied to the brake piston 18, causing the brake piston 18 to move axially in the direction of arrow 82, wherein the second braking surface 42 of the brake disk 22 disengages from the brake cover 14 and moves axially in the direction 82 a distance corresponding to the final running clearance 26b. The brake piston 18 then disengages from the first braking surface 40 and moves axially in the direction 82 a distance corresponding to the running clearance 26a. As pressure is released from the brake piston 18, the pressure applied to the spring 32 is released and the spring 32 returns to its uncompressed state and thereby returns the bolt 44 to its biased position. Thus, the axial movement of the brake piston 18 in the direction 82 causes the bolt 44 to move axially in the direction 82 with the brake piston 18. In returning to its biased position, the axial movement of the bolt 44 is limited to the distance between the spacer 72 and the biased position of the body portion 60, i.e., a distance equal to the optimal running clearance 74, which is equal to the sum of the running clearances 26a and 26b.

Generally, in brake retractor assemblies, as fluid pressure is released from the brake piston, the brake piston has a tendency to move away from the bolt, and thus the brake disk, so as to undesirably increase the running clearance and the pedal throw required for brake engagement. This is commonly referred to as blowback. Embodiments of the present invention, however, include a bolt 44 fixedly retained to the brake piston, for example by the snap ring 66, which prevents the brake piston 18 from moving away from the bolt 44, and thus the brake disk 22. Thus, as the brake piston 18 and the bolt 44 move axially in the direction 82, the snap ring 66, which holds the brake piston 18 against the bolt 44, cooperates with the spring-biased position of the bolt 44 to maintain the optimal running clearance 74.

In a preferred embodiment, the brake cover 14 and the bolt 44 can be disassembled from the brake piston 18 without removal of the snap ring 66. When the brake cover 14 and the bolt 44 are pulled away from the brake piston 18, in the direction 80, with sufficient force, the snap ring 66 is configured to be compressed to the fit within the diameter of the bore 64 defined in the brake piston 18 so that the nose portion 58 is able to slide through the bore 64, resulting in separation of the brake cover 14 and bolt 44 from the brake piston 18.

In this embodiment, the brake cover 14 and bolt 44 can be assembled to the brake piston 18 by pushing the nose portion 58 of the bolt 44 up against the entrance to the bore 64 at the side 68 of the brake piston 18. Pushing the bolt 44 in the direction 82 compresses the snap ring 66 to fit within the diameter of the bore 64 and thereby allows the nose portion 58 to slide through the bore 64 until the snap ring 66 exits the bore 64 and engages the opposing side 70 of the brake piston 18 as it returns to its uncompressed state. The opposing sides 68 and 70 of the brake piston 18 may include tapered edges at the entrance and exit of the bore 64 such that when sufficient force is applied in either pulling the bolt 44 in the direction 80 or pushing the bolt 44 in the direction 82, the snap ring 66 engages the tapered edges which provide a compression force to compress the snap rings 66 and allow the nose portion 58 of the bolt 44 to slide through the bore 64 in either the assembly or disassembly of the brake retractor assembly.

While the above description is one embodiment, the number of brake disks 22 may vary significantly between applications. Depending on the weight and performance of a particular tractor it may have as few as one brake disk 22 (FIGS. 1, 3, and 4), two brake disks 22a, b (FIG. 2), or more than two (not shown) without departing from the spirit of the present invention.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A brake retractor assembly for a vehicle such as an agricultural vehicle, the brake assembly comprising:
 a brake housing and a brake cover defining a friction chamber;
 a brake piston being arranged within the friction chamber and coupled to the brake cover by a bolt, the bolt including a first end attached to the brake cover and a second end coupled to the brake piston, the second end of the bolt having a first portion and a second portion, wherein the first portion engages a first side of the brake piston and the second portion passes through the brake piston via a second bore and is retained to the brake piston at an opposing second side of the brake piston and is fixedly retained to the brake piston;
 a spacer disposed adjacent to a first bore, wherein the first portion of the second end of the bolt is axially spaced from the brake cover by a distance exceeding an axial height of the spacer, the distance exceeding the axial height of the spacer defining an optimal running clearance;
 wherein the first portion of the second end of the bolt includes a flange, wherein the flange engages the first side of the brake piston and cooperates with the retained second portion of the second end of the bolt to couple the second end of the bolt to the brake piston such that axial movement of the brake piston is limited to axial movement of the bolt, wherein the brake piston is prevented from moving away from the bolt thereby maintaining desired running clearances;

at least one spring arranged coaxially around the bolt and located between the flange of the first portion of the second end of the bolt and the spacer, the spring biasing the first portion of the second end of the bolt to a biased position defined by the first portion of the second end of the bolt being axially spaced from the brake cover by a distance exceeding the axial height of the spacer by an amount equal to the optimal running clearance;

an actuation system coupled to apply an axial force to the brake piston; and at least one brake disk having braking surfaces provided within the friction chamber between the brake piston and the brake cover, wherein activation of the actuation system results in axial movement of the brake piston in a first direction until the braking surfaces of the brake disk engage the brake piston and the brake cover, wherein deactivation of the actuation system results in axial movement of the brake piston in a second direction, wherein the braking surfaces of the brake disk disengage the brake piston and the brake cover, wherein axial movement of the brake piston in the second direction is limited by the fixed retention of the bolt to the brake piston;

wherein running clearances are defined between the braking surfaces, the brake piston, and the brake cover when the actuation system is disengaged, the sum of the running clearances being equal to the optimal running clearance.

2. The brake retractor assembly of claim 1 wherein the second end of the bolt is fixedly retained to the brake piston by a snap ring.

3. The brake retractor assembly of claim 1 wherein the first end of the bolt occupies a first outer diameter, wherein the first portion of the second end of the bolt occupies a second outer diameter, wherein the spacer occupies an inner diameter, the inner diameter being greater than the first outer diameter and less than or equal to the second outer diameter.

4. The brake retractor assembly of claim 1 wherein activation of the actuation system results in axial movement of the brake piston in the first direction which results in compression of the spring which further results in axial movement of the bolt in the first direction.

5. The brake retractor assembly of claim 3 wherein axial movement of the bolt in the first direction includes the first end of the bolt being moved through the spacer and the first bore as the first portion of the second end of the bolt is moved from the biased position until the first portion of the second end meets the spacer, the axial movement of the bolt in the first direction thereby being limited to the optimal running clearance.

6. The brake retractor assembly of claim 1 wherein deactivation of the actuation system results in expansion of the biasing spring which results in axial movement of the bolt in the second direction which further results in axial movement of the brake piston in the second direction.

7. The brake retractor assembly of claim 6 wherein expansion of the biasing spring returns the first portion of the second end of the bolt to its biased position, the axial movement of the bolt in the second direction thereby being limited to the optimal running clearance.

8. The brake retractor assembly of claim 1 including at least two brake disks and at least one separator plate arranged between the at least two brake disks.

9. The brake retractor assembly of claim 8 wherein the separator plate is coupled to the brake cover by a spline to prevent rotation of the separator plate relative thereto.

10. The brake retractor assembly of claim 8 wherein the separator plate is coupled to the brake cover by at least one tab to prevent rotation of the separator plate relative thereto.

11. The brake retractor assembly of claim 1 further comprising a plurality of bolts, wherein the brake piston is coupled to the brake cover by the plurality of bolts.

12. The brake retractor assembly of claim 1 wherein the friction chamber is filled with oil.

13. The brake retractor assembly of claim 1 wherein the brake retractor assembly is coupled to a drive shaft of the vehicle and is arranged between a transmission and a differential of the vehicle.

14. The brake retractor assembly of claim 1 wherein the brake retractor assembly is coupled to a drive shaft of the vehicle and is arranged between a wheel and a differential of the vehicle.

* * * * *